US009595290B2

(12) United States Patent
Sekii et al.

(10) Patent No.: US 9,595,290 B2
(45) Date of Patent: Mar. 14, 2017

(54) METHOD OF MANUFACTURING FLUID BEARING APPARATUS AND SPINDLE MOTOR INCLUDING PRESS WORKING A CYLINDRICAL INNER SURFACE PROVIDED WITH A PLATING LAYER

(71) Applicant: Nidec Corporation, Kyoto (JP)

(72) Inventors: Yoichi Sekii, Kyoto (JP); Asami Ito, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/690,583

(22) Filed: Apr. 20, 2015

(65) Prior Publication Data

US 2016/0125896 A1 May 5, 2016

Related U.S. Application Data

(60) Provisional application No. 62/097,626, filed on Dec. 30, 2014.

(30) Foreign Application Priority Data

Nov. 4, 2014 (JP) .................................. 2014-224040

(51) Int. Cl.
*G11B 19/20* (2006.01)
*F16C 17/10* (2006.01)
*H02K 7/08* (2006.01)

(52) U.S. Cl.
CPC ........ *G11B 19/2036* (2013.01); *F16C 17/102* (2013.01); *G11B 19/20* (2013.01); *H02K 7/088* (2013.01)

(58) Field of Classification Search
CPC ..................... G11B 19/2036; F16C 17/102
USPC ............................... 360/98.07, 99.08
See application file for complete search history.

(56) References Cited

U.S. PATENT DOCUMENTS

| 3,973,319 | A | * | 8/1976 | Klose | B24B 39/023 29/90.01 |
| 4,030,855 | A | * | 6/1977 | Kress | B23D 77/044 408/226 |
| 5,546,839 | A | * | 8/1996 | Gardiner | B26D 5/12 83/123 |
| 5,918,985 | A | * | 7/1999 | Bosley | F01D 25/168 384/105 |

(Continued)

FOREIGN PATENT DOCUMENTS

| JP | 10-141360 A | 5/1998 |
| JP | 2002-153015 A | 5/2002 |

(Continued)

*Primary Examiner* — Jefferson Evans
(74) *Attorney, Agent, or Firm* — Keating & Bennett, LLP

(57) ABSTRACT

A method of manufacturing a fluid bearing apparatus includes plating a metallic base material including a cylindrical base material inner circumferential surface, and pressing by bringing a contact portion of a pressing member into contact with a plating layer on the base material inner circumferential surface in the plating step. At least a portion of the pressing member including the contact portion has a Young's modulus equal to or greater than a Young's modulus of the base material. In the pressing step a surface of the plating layer is smoothened without causing a plastic deformation of the base material by bringing the pressing member into contact with the plating layer.

13 Claims, 11 Drawing Sheets

(56) References Cited

U.S. PATENT DOCUMENTS

| | | | | |
|---|---|---|---|---|
| 6,155,721 | A * | 12/2000 | Kurosawa | F16C 17/026 384/100 |
| 9,022,065 | B1 * | 5/2015 | Kliewer | F16K 37/0008 116/274 |
| 2003/0025413 | A1 * | 2/2003 | Takasu | G11B 19/2009 310/156.28 |
| 2005/0108878 | A1 | 5/2005 | Nishimura et al. | |
| 2005/0115524 | A1 * | 6/2005 | Sanada | F02B 75/243 123/55.4 |
| 2006/0056750 | A1 * | 3/2006 | Yamamoto | C22C 38/02 384/100 |
| 2007/0047859 | A1 * | 3/2007 | Asada | F16C 33/107 384/107 |
| 2008/0057223 | A1 * | 3/2008 | Lee | C23C 4/02 427/576 |
| 2008/0211334 | A1 * | 9/2008 | Tokuno | F16C 17/045 310/90 |
| 2009/0034118 | A1 * | 2/2009 | Gomyo | F16C 33/107 360/99.08 |
| 2009/0280018 | A1 * | 11/2009 | Ichiyanagi | F04C 18/0215 418/55.1 |
| 2010/0202080 | A1 | 8/2010 | Iguchi et al. | |
| 2010/0296190 | A1 | 11/2010 | Yamada et al. | |
| 2011/0019303 | A1 | 1/2011 | Yamada et al. | |
| 2012/0063030 | A1 | 3/2012 | Yamada et al. | |
| 2012/0251300 | A1 * | 10/2012 | Struziak | F04D 29/057 415/170.1 |
| 2013/0243356 | A1 | 9/2013 | Yamada et al. | |
| 2014/0158457 | A1 * | 6/2014 | Hanna | G10K 11/168 181/207 |
| 2014/0286600 | A1 * | 9/2014 | Yamada | F16C 33/745 384/107 |

FOREIGN PATENT DOCUMENTS

| | | |
|---|---|---|
| JP | 2002-199654 A | 7/2002 |
| JP | 2005-155673 A | 6/2005 |
| JP | 2008-190572 A | 8/2008 |

* cited by examiner

METHOD OF MANUFACTURING FLUID BEARING APPARATUS AND SPINDLE MOTOR INCLUDING PRESS WORKING A CYLINDRICAL INNER SURFACE PROVIDED WITH A PLATING LAYER

BACKGROUND OF THE INVENTION

1. Field of the Invention

The present invention relates to a method of manufacturing a fluid bearing apparatus and more specifically to a method of manufacturing a fluid bearing apparatus of a spindle motor.

2. Description of the Related Art

Spindle motors arranged to rotate disks are typically installed in hard disk apparatuses and optical disk apparatuses. Such spindle motors include a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion.

The stationary portion and the rotating portion of the spindle motor are joined to each other through a fluid dynamic bearing. A known spindle motor including a fluid dynamic bearing is described, for example, in JP-A 2008-190572. The spindle motor described in JP-A 2008-190572 includes a dynamic pressure bearing including a lubricating oil (see paragraph [0021] and FIG. 1 of JP-A 2008-190572).

In a dynamic pressure bearing of this type, a plated member is sometimes used as a bearing member defining a portion of the dynamic pressure bearing. Also in the spindle motor described in JP-A 2008-190572, a sleeve member defining a portion of the dynamic pressure bearing is plated with nickel (see paragraph of JP-A 2008-190572).

However, a plating process may produce a nodule projecting from a surface of a plating layer and an undulation portion at which a layer thickness of the plating layer is uneven. In the fluid dynamic bearing, a stationary bearing member and a rotating bearing member are arranged opposite to each other with a slight gap intervening therebetween, and a fluid is arranged in this gap. During rotation, a dynamic pressure is produced in the fluid arranged in the gap, so that the rotating bearing member is supported with respect to the stationary bearing member. Therefore, a low degree of dimensional accuracy of any bearing member may hinder production of the dynamic pressure.

SUMMARY OF THE INVENTION

According to preferred embodiments of the present invention it is possible to smoothen an inner circumferential surface of a plating bearing layer without causing plastic deformation of the base material. This leads to an improvement in dimensional accuracy of the inner circumferential surface.

According to a first preferred embodiment of the present invention, a method of manufacturing a fluid bearing apparatus including a plated bearing member is provided. The method includes the steps of a) plating a metallic base material including a cylindrical base material inner circumferential surface to define a plating layer on the base material inner circumferential surface; and b) bringing a contact portion of a pressing member into contact with the plating layer after step a). At least a portion of the pressing member, the portion including the contact portion, has a Young's modulus equal to a Young's modulus of the base material or greater than the Young's modulus of the base material. In step b), by bringing the pressing member into contact with the plating layer, a surface of the plating layer is smoothened without causing plastic deformation of the base material.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a spindle motor is referred to by the term "axial direction", "axial", or "axially", that directions perpendicular or substantially perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that the axial direction is a vertical direction, and that a side on which a top cover is arranged with respect to a base plate is an upper side, and the shape of each member or portion and relative positions of different members or portions will be described on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the wording "identical", "equal", etc. as used herein also comprehends "substantially identical", "substantially equal", etc. Also note that the wording "cylindrical" as used herein also comprehends "substantially cylindrical".

Figure 1:
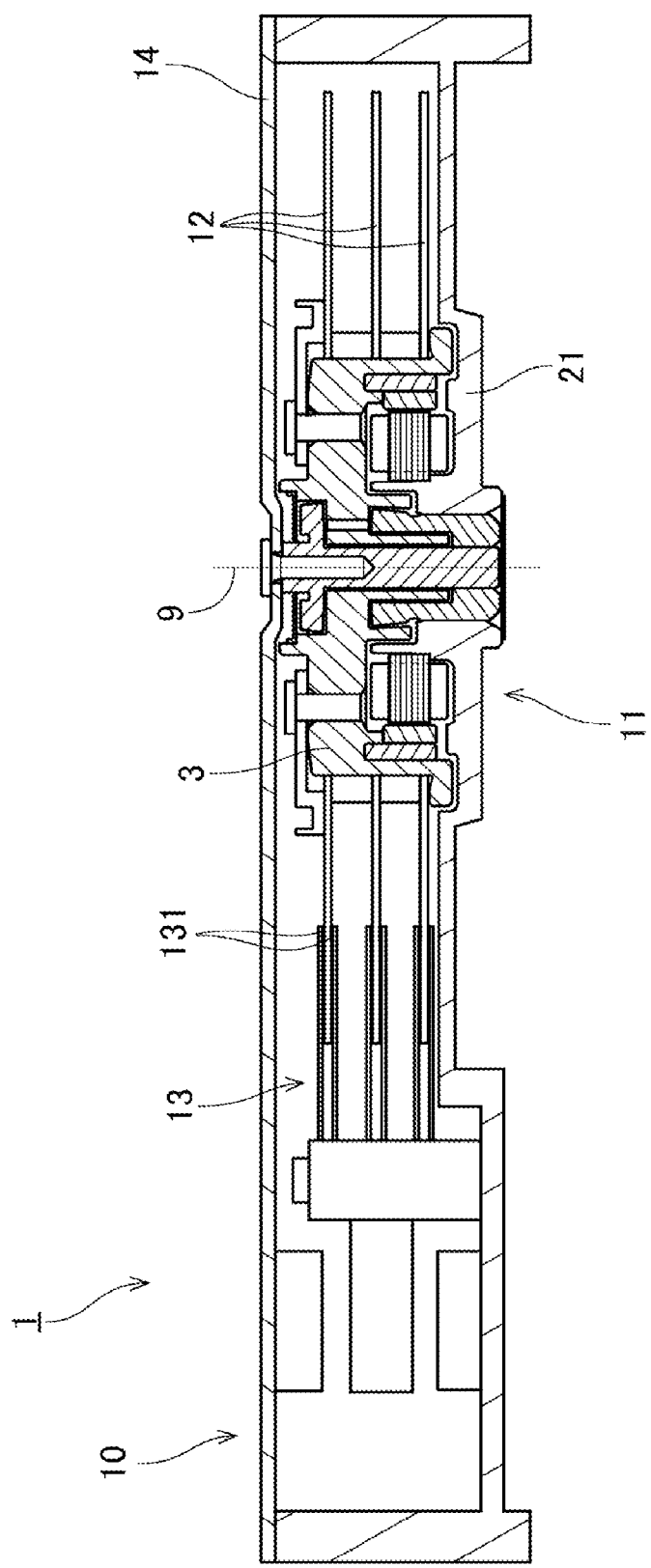
FIG. 1 is a vertical cross-sectional view of a disk drive apparatus according to a first preferred embodiment of the present invention.

FIG. 1 is a vertical cross-sectional view of a disk drive apparatus 1 in which a spindle motor 11 according to a first preferred embodiment of the present invention is installed. The disk drive apparatus 1 is configured to rotate magnetic disks 12, each of which includes a circular hole at a center thereof, to perform reading and writing of information from or to the magnetic disks 12. Three magnetic disks 12 are preferably included in the disk drive apparatus, but any other desirable number of magnetic disks could be used instead. As illustrated in FIG. 1, the disk drive apparatus 1 includes the spindle motor 11, the magnetic disks 12, an access portion 13, and a top cover 14.

The spindle motor 11 is configured to rotate the magnetic disks 12 about a central axis 9 while supporting the three magnetic disks 12. The spindle motor 11 preferably includes a base plate 21 extending perpendicularly or substantially perpendicularly to the central axis 9. An upper side of the base plate 21 is covered with the top cover 14. A rotating portion 3 of the spindle motor 11, the three magnetic disks 12, and the access portion 13 are accommodated inside a case 10 defined by the base plate 21 and the top cover 14. The access portion 13 is configured to move heads 131 along recording surfaces of the magnetic disks 12 to perform the reading and writing of information from or to the magnetic disks 12.

As noted above, the number of magnetic disks 12 included in the disk drive apparatus 1 may alternatively be one, two, or more than three. Also note that the access portion 13 may be configured to perform at least one of the reading and the writing of information from or to the magnetic disk(s) 12.

An interior space of the case 10 is preferably a clean space with no, or only an extremely small amount of, dirt or dust. The interior of the case 10 is preferably filled with clean air. Note, however, that the interior of the case 10 may alternatively be filled with a helium gas, a hydrogen gas, or a nitrogen gas instead of air. Also note that the interior of the case 10 may alternatively be filled with a mixture of any of these gases and air.

Figure 2:
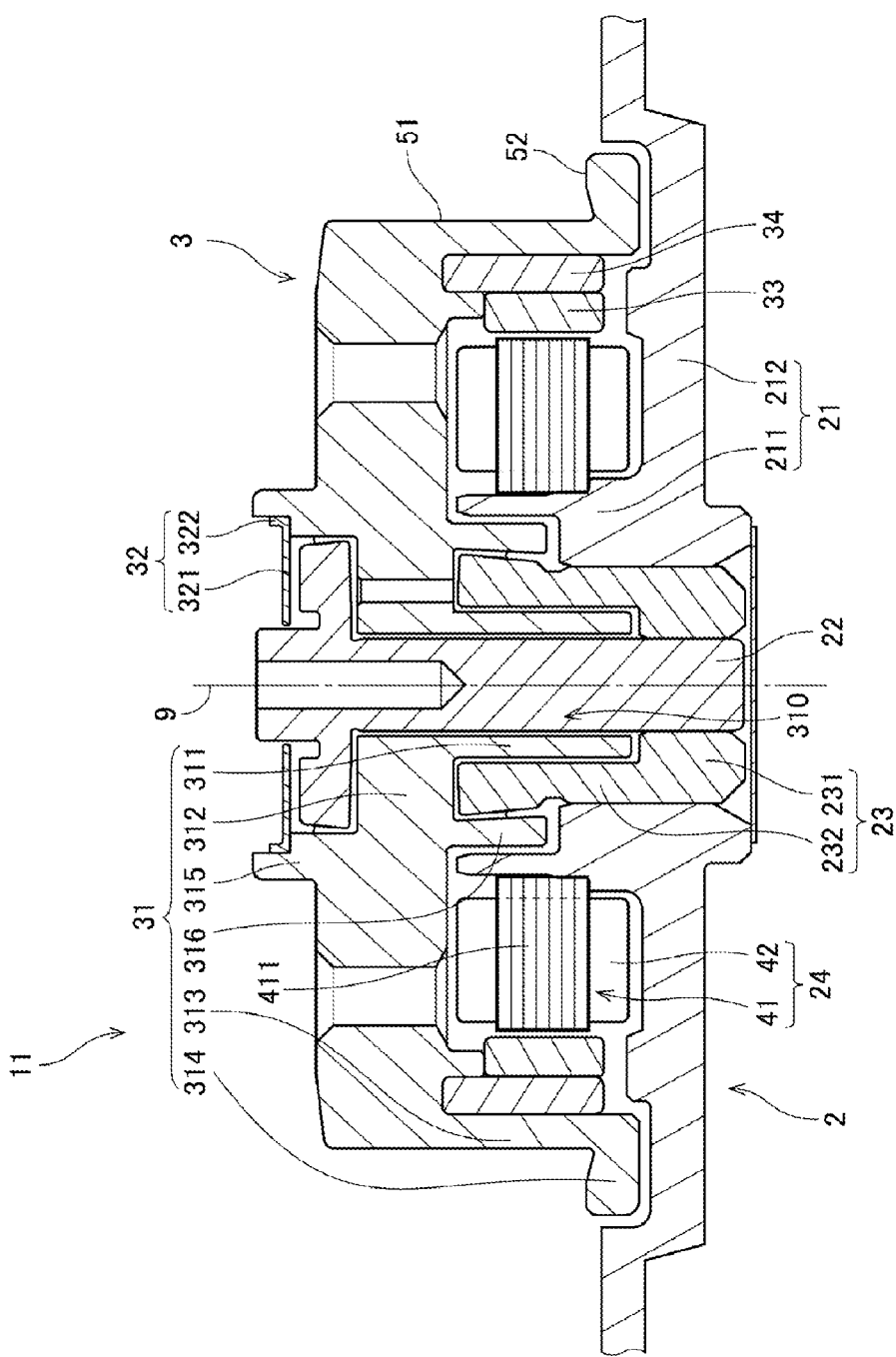
FIG. 2 is a vertical cross-sectional view of a spindle motor according to the first preferred embodiment of the present invention.

Next, the structure of the spindle motor 11 used in the disk drive apparatus 1 will now be described in more detail below. FIG. 2 is a vertical cross-sectional view of the spindle motor 11.

As illustrated in FIG. 2, the spindle motor 11 includes a stationary portion 2 and the rotating portion 3. The stationary portion 2 is configured to be stationary relative to the case 10 of the disk drive apparatus 1. The rotating portion 3 is supported to be rotatable with respect to the stationary portion 2.

The stationary portion 2 preferably includes the base plate 21, a shaft 22, a lower annular member 23, and a stator 24.

The base plate 21 preferably extends perpendicularly or substantially perpendicularly to the central axis 9 below the stator 24, a rotating member 31 (described below), a magnet 33 (described below), the magnetic disks 12, and the access portion 13. A metal, such as an aluminum alloy, for example, is preferably used as a material of the base plate 21. As illustrated in FIG. 2, the base plate 21 preferably includes a cylindrical holder portion 211 and a plate portion 212. The cylindrical holder portion 211 extends in the axial direction to substantially assume the shape of a cylinder radially inside of the stator 24. The plate portion 212 extends radially outward from the cylindrical holder portion 211.

The shaft 22 extends along the central axis 9. A metal, such as stainless steel, for example, is preferably used as a material of the shaft 22. As illustrated in FIG. 1, an upper end portion of the shaft 22 is fixed to the top cover 14 of the disk drive apparatus 1. Meanwhile, a lower end portion of the shaft 22 is fixed to the cylindrical holder portion 211 of the base plate 21 through the lower annular member 23.

Figure 3:
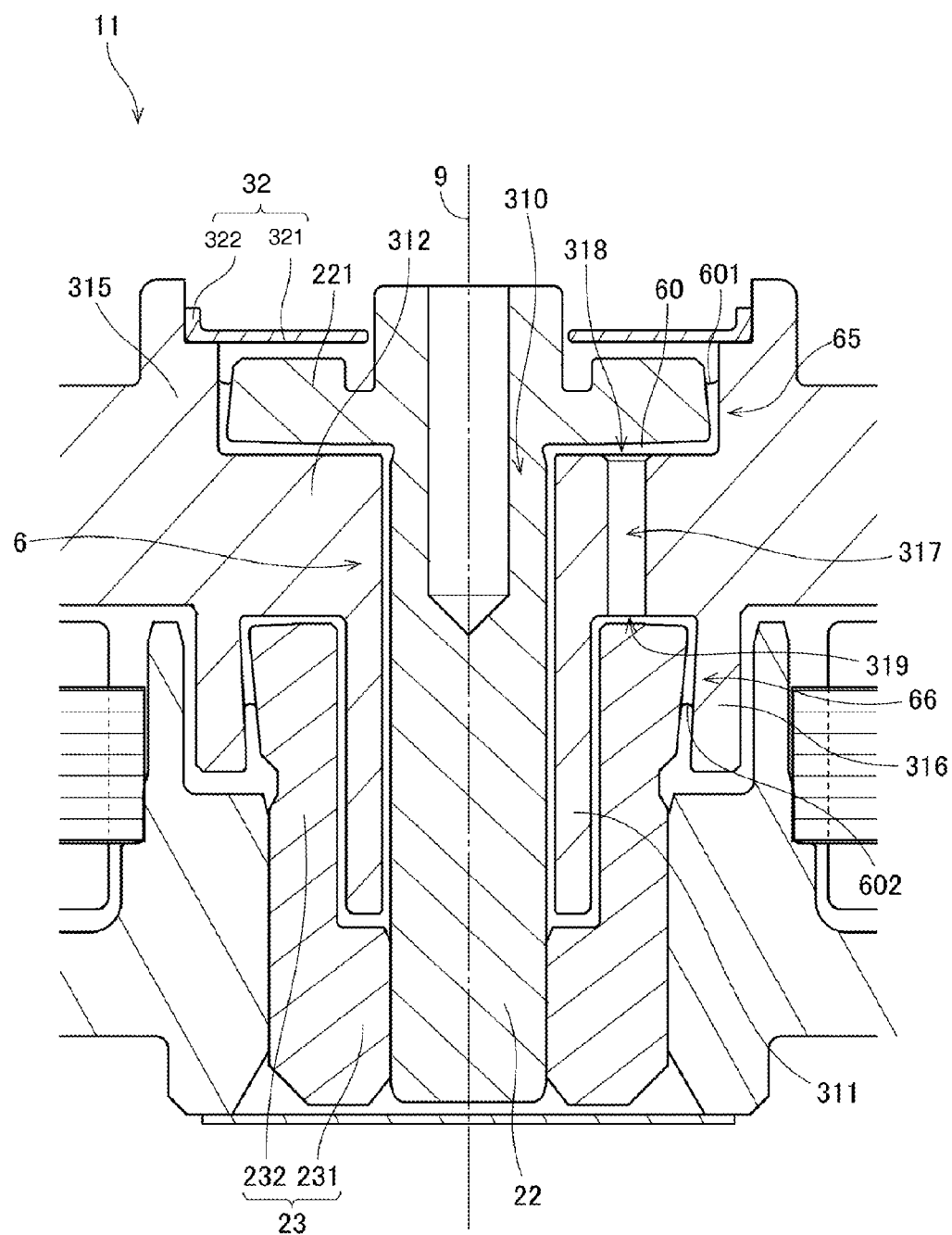
FIG. 3 is a partial vertical cross-sectional view of the spindle motor according to the first preferred embodiment of the present invention.

As illustrated in FIG. 3, the shaft 22 includes an upper annular portion 221. The upper annular portion 221 projects radially outward in the vicinity of the upper end portion of the shaft 22. The upper annular portion 221 is located between an upper surface of a connection portion 312 described below and a lower surface of a cap plate portion 321 described below. The upper annular portion 221 is a portion of a member constituting the shaft 22. Note, however, that the upper annular portion 221 and the shaft 22 may alternatively be defined by separate members.

The lower annular member 23 is positioned below the upper annular portion 221, and is configured to surround the shaft 22 and an inner cylindrical portion 311 of the rotating member 31 described below in an annular shape. A metal, such as copper or brass, for example, is preferably used as a material of the lower annular member 23. The lower annular member 23 is preferably fixed to the shaft 22 through press fitting, shrink fitting, an adhesive, or the like. Note, however, that the shaft 22 and the lower annular member 23 may alternatively be defined by a single continuous monolithic member.

The lower annular member 23 preferably includes a bottom portion 231 and a wall portion 232. The bottom portion 231 extends in an annular shape below the inner cylindrical portion 311 of the rotating member 31 described below. An inner circumferential surface of the bottom portion 231 is fixed to an outer circumferential surface of the shaft 22. The wall portion 232 extends upward from the bottom portion 231 to assume or substantially assume the shape of a cylinder radially outside of the inner cylindrical portion 311. An outer circumferential surface of the wall portion 232 is fixed to an inner circumferential surface of the cylindrical holder portion 211.

The stator 24 is an armature of the spindle motor 11. The stator 24 includes a stator core 41 and a plurality of coils 42. The stator core 41 is preferably, for example, defined by laminated steel sheets, that is, electromagnetic steel sheets, such as silicon steel sheets, placed one upon another in the axial direction. The stator core 41 is fixed to an outer circumferential surface of the cylindrical holder portion 211. In addition, the stator core 41 includes a plurality of teeth 411 projecting radially outward. The coils 42 are a collection of conducting wires wound around the teeth 411. The teeth 411 and the coils 42 are arranged in an annular shape with the central axis 9 as a center.

The rotating portion 3 includes the rotating member 31, a cap 32, the magnet 33, and a yoke 34.

The rotating member 31 is an annular member arranged around the shaft 22. The rotating member 31 is preferably a base material made of, for example, stainless steel with a surface plated with nickel. A method of manufacturing the rotating member 31 will be described below. Note that, instead of stainless steel, a metal, such as aluminum or copper, for example, may be used as a material of the rotating member 31.

The rotating member 31 includes a central through hole 310 configured to pass therethrough in the vertical direction. At least a portion of the shaft 22 is accommodated in the central through hole 310. The rotating member 31 preferably includes the inner cylindrical portion 311, the connection portion 312, an outer cylindrical portion 313, a disk mount portion 314, an upper projecting portion 315, and a lower projecting portion 316.

The inner cylindrical portion 311 is configured to surround the shaft 22 in an annular shape below the upper annular portion 221 and above the lower annular member 23. The connection portion 312 extends radially outward from an upper end portion of the inner cylindrical portion 311 to assume or substantially assume the shape of a disk. The outer cylindrical portion 313 extends downward from a radially outer end portion of the connection portion 312 to assume the shape of a tube. That is, the connection portion 312 extends radially to join the inner cylindrical portion 311 and the outer cylindrical portion 313 to each other. The disk mount portion 314 projects farther radially outward from a lower end portion of the outer cylindrical portion 313 to assume the shape of a ring.

A cylindrical outer circumferential surface 51 of the outer cylindrical portion 313 is fitted in the circular holes 120 of the magnetic disks 12. An inner circumferential portion of each magnetic disk 12 is in contact with at least a portion of the outer circumferential surface 51 of the outer cylindrical portion 313. The magnetic disks 12 are thus radially positioned. An upper surface 52 of the disk mount portion 314 extends radially outward from the outer circumferential surface of the outer cylindrical portion 313. A lower surface of the lowermost magnetic disk 12 is in contact with at least a portion of the upper surface 52 of the disk mount portion 314. The magnetic disks 12 are thus axially positioned.

As described above, the outer circumferential surface 51 of the outer cylindrical portion 313 defines a first disk support surface, while the upper surface 52 of the disk mount portion 314 defines a second disk support surface. The three magnetic disks 12 are supported by these first and second disk support surfaces.

The upper projecting portion 315 extends upward from the upper surface of the connection portion 312 to assume the shape of a cylinder between the inner cylindrical portion 311 and the outer cylindrical portion 313. The upper projecting portion 315 is arranged radially outward of the upper annular portion 221. An inner circumferential surface of the upper projecting portion 315 includes a shoulder recessed radially outward. The lower projecting portion 316 extends downward from a lower surface of the connection portion 312 to assume the shape of a cylinder between the inner cylindrical portion 311 and the outer cylindrical portion 313. The lower projecting portion 316 is arranged radially outward of the wall portion 232 of the lower annular member 23.

Although the rotating member 31 is preferably defined by a single monolithic member including a sleeve defining a portion of a fluid dynamic bearing, and a hub including the disk mount portion, the present invention is not limited to this. For example, the rotating member 31 may alternatively be defined by two members, with the sleeve and the hub being separate from each other.

The cap 32 is a disk-shaped or substantially disk-shaped member including a circular hole at a center thereof. The cap 32 may be made of either a metal or a resin, for example. The cap 32 preferably includes the cap plate portion 321 and a cap projecting portion 322. The cap plate portion 321 extends in an annular shape above the upper annular portion 221. An inner circumferential portion of the cap plate portion 321 is positioned radially opposite to the outer circumferential surface of the shaft 22 in the vicinity of the upper end portion of the shaft 22 with a slight gap intervening therebetween. The cap projecting portion 322 projects upward from a radially outer end portion of the cap plate portion 321 to assume or substantially assume the shape of a cylinder.

A corner portion which is at a junction of the cap plate portion 321 and the cap projecting portion 322 is fitted to the shoulder of the upper projecting portion 315. An outer circumferential surface of the cap projecting portion 322 is fixed to the inner circumferential surface of the upper projecting portion 315 through, for example, an adhesive. Thus, the cap 32 is caused to rotate together with the rotating member 31 once the rotating member 31 starts rotating.

The magnet 33 is positioned radially outside of the stator 24. The magnet 33 is fixed to an inner circumferential surface of the outer cylindrical portion 313 through the yoke 34, which is made of a magnetic material. The magnet 33 is preferably annular. A radially inner surface of the magnet 33 is arranged radially opposite to a radially outer end surface of each of the teeth 411 with a slight gap intervening therebetween. In addition, an inner circumferential surface of the magnet 33 includes north and south poles arranged to alternate with each other in a circumferential direction.

Note that a plurality of magnets may be used in place of the annular magnet 33. In the case where the plurality of magnets are used, the magnets are arranged in the circumferential direction such that north and south poles alternate with each other.

Once electric drive currents are supplied to the coils in the spindle motor 11 described above, magnetic flux is generated around each of the teeth 411. Then, interaction between the magnetic flux of the teeth 411 and magnetic flux of the magnet produces a circumferential torque between the stationary portion 2 and the rotating portion 3, so that the rotating portion 3 is caused to rotate about the central axis 9 with respect to the stationary portion 2. The magnetic disks 12 supported by the rotating member 31 are caused to rotate about the central axis 9 together with the rotating portion 3.

Next, the structure of a fluid dynamic bearing 6 included in the spindle motor 11 will now be described below. FIG. 3 is a partial vertical cross-sectional view of the spindle motor 11, illustrating the fluid dynamic bearing 6 and its vicinity. As illustrated in FIG. 3, a lubricating fluid 60 is located to intervene between a combination of the shaft 22 and the lower annular member 23 and the rotating member 31. A polyolester oil or a diester oil, for example, is preferably used as the lubricating fluid 60. The rotating member 31 is supported through the lubricating fluid 60 to be rotatable with respect to the combination of the shaft 22 and the lower annular member 23.

As described above, the fluid dynamic bearing 6, which is a fluid bearing apparatus, is defined by the combination of the shaft 22 and the lower annular member 23, which are components of the stationary portion 2, the rotating member 31, which is a component of the rotating portion 3, and the lubricating fluid 60, which is arranged to intervene therebetween. The rotating portion 3 is rotatably supported through the fluid dynamic bearing 6. That is, the combination of the shaft 22 and the lower annular member 23 defines a first bearing member, while the rotating member 31 defines a second bearing member.

Figure 4:
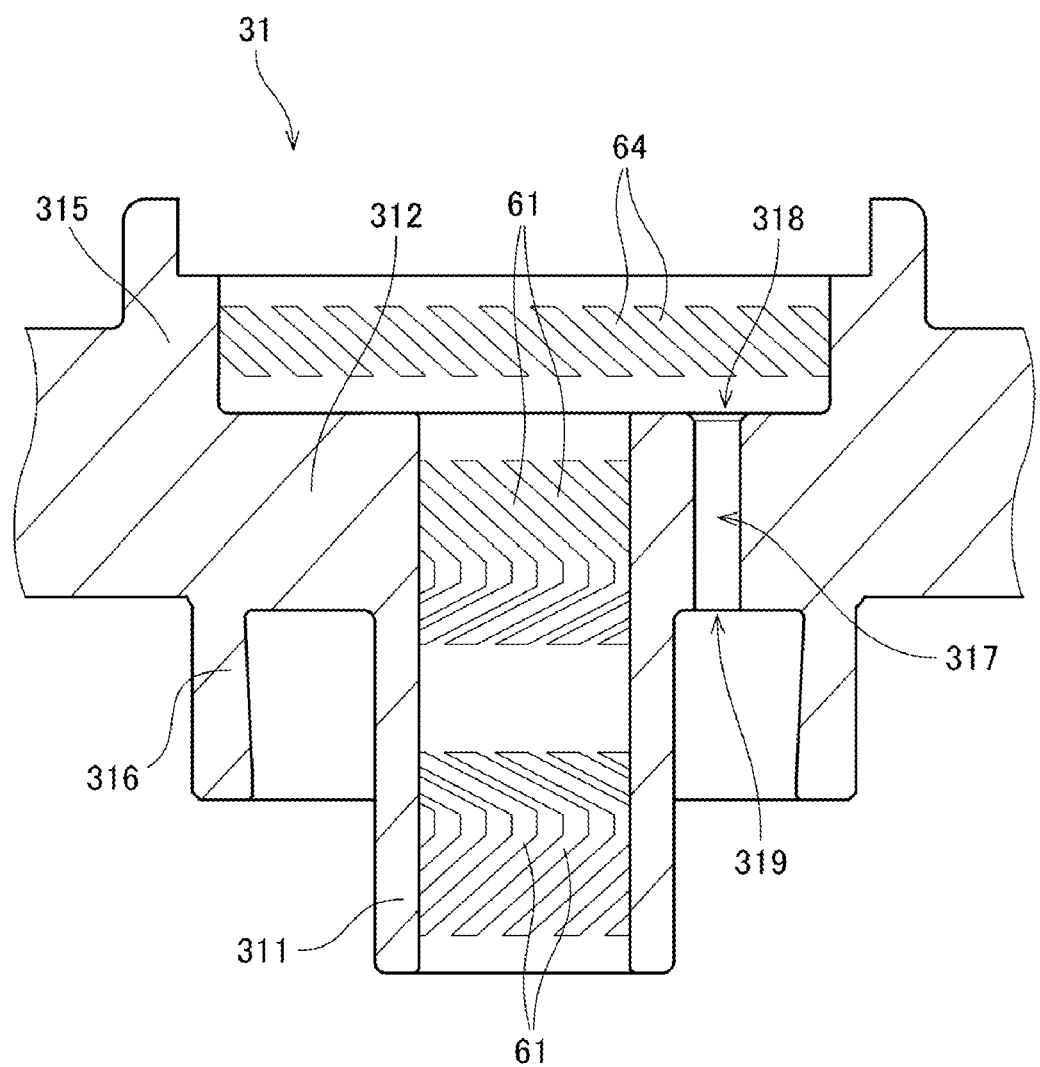
FIG. 4 is a vertical cross-sectional view of a sleeve according to the first preferred embodiment of the present invention.

FIG. 4 is a partial vertical cross-sectional view of the rotating member 31. As illustrated in FIG. 4, an inner circumferential surface of the inner cylindrical portion 311 and an inner circumferential surface of the connection portion 312 include upper and lower radial dynamic pressure groove arrays 61 each of which is preferably arranged in a herringbone pattern. In addition, a plating layer is defined on each of the inner circumferential surface of the inner cylindrical portion 311 and the inner circumferential surface of the connection portion 312. At grooves of the radial dynamic pressure groove arrays 61, the plating layer is shaped in accordance with the shape of each groove defined in the base material of the rotating member 31.

The rotating member 31 is configured to rotate in one direction with respect to the shaft 22 while the spindle motor 11 is running. At this time, the radial dynamic pressure groove arrays 61 induce a dynamic pressure in a portion of the lubricating fluid 60 which is present between the shaft 22 and the rotating member 31. The rotating member 31 is thus supported radially with respect to the shaft 22. Note that it is enough that the radial dynamic pressure groove arrays 61 should be defined in at least one of the outer circumferential surface of the shaft 22 and an inner circumferential surface of the rotating member 31.

Figure 5:
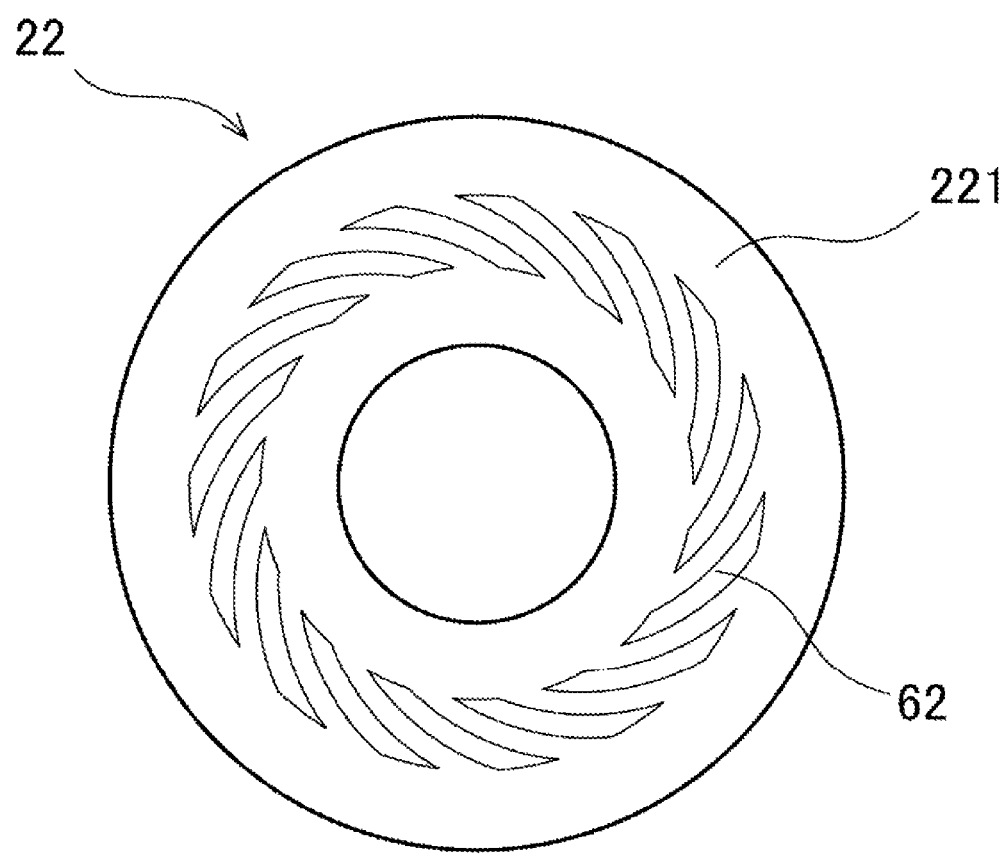
FIG. 5 is a bottom view of a shaft according to the first preferred embodiment of the present invention.
Figure 6:
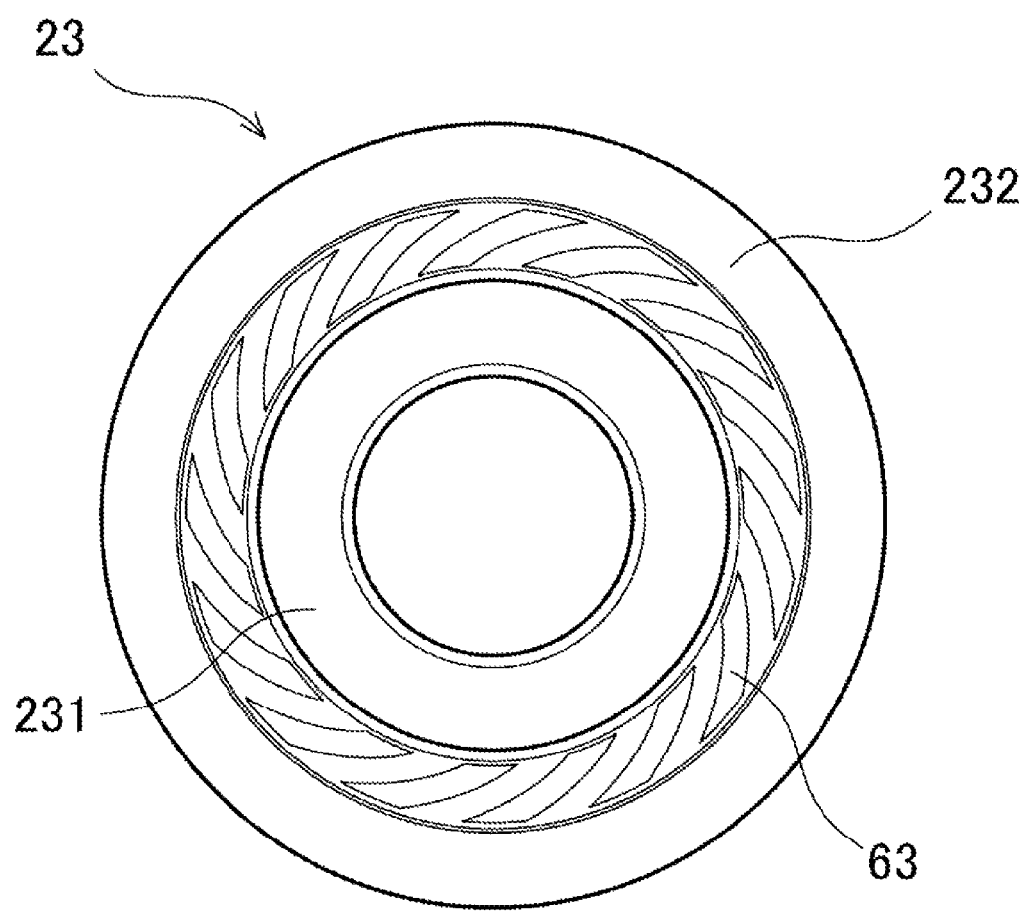
FIG. 6 is a top view of an annular member according to the first preferred embodiment of the present invention.

FIG. 5 is a bottom view of the shaft 22. As illustrated in FIG. 5, a lower surface of the upper annular portion 221 preferably includes a first thrust dynamic pressure groove array 62 arranged in a spiral pattern. FIG. 6 is a top view of the lower annular member 23. As illustrated in FIG. 6, an upper surface of the wall portion 232 preferably includes a second thrust dynamic pressure groove array 63 arranged in a spiral pattern.

The rotating member 31 is configured to rotate in one direction with respect to the shaft 22 and the lower annular member 23 while the spindle motor 11 is running. At this time, the first thrust dynamic pressure groove array 62 induces a dynamic pressure in a portion of the lubricating fluid 60 which is present between the lower surface of the upper annular portion 221 and the upper surface of the connection portion 312. Meanwhile, the second thrust dynamic pressure groove array 63 induces a dynamic pressure in a portion of the lubricating fluid 60 which is present between the upper surface of the wall portion 232 and the lower surface of the connection portion 312. The rotating member 31 is thus supported axially with respect to the shaft 22 and the lower annular member 23.

Note that it is enough that the first thrust dynamic pressure groove array 62 should be defined in at least one of the lower surface of the upper annular portion 221 and a portion of the upper surface of the connection portion 312 which is opposed to the upper annular portion 221. Also note that it is enough that the second thrust dynamic pressure groove array 63 should be defined in at least one of the upper surface of the wall portion 232 and a portion of the lower surface of the connection portion 312 which is opposed to the wall portion 232. Also note that each of the first and second thrust dynamic pressure groove arrays may be a groove array arranged in a herringbone pattern.

As illustrated in FIG. 3, the lubricating fluid 60 includes an upper liquid surface 601 and a lower liquid surface 602. The upper liquid surface 601 is located between an outer circumferential surface of the upper annular portion 221 and the inner circumferential surface of the upper projecting portion 315. That is, the outer circumferential surface of the upper annular portion 221 and the inner circumferential surface of the upper projecting portion 315 are configured to together define an upper seal portion 65 configured to hold the upper liquid surface 601 of the lubricating fluid 60. The upper seal portion 65 and the fluid dynamic bearing 6 are connected with each other. In the upper seal portion 65, the radial distance between the outer circumferential surface of the upper annular portion 221 and the inner circumferential surface of the upper projecting portion 315 is configured to gradually increase with increasing height. The upper liquid surface 601 of the lubricating fluid 60 is accordingly attracted downward by surface tension to define a meniscus. A reduction in a leakage of the lubricating fluid 60 through the upper seal portion 65 is achieved by arranging the radial width of the upper seal portion 65 to gradually increase with increasing height to cause the liquid surface 601 to define the meniscus.

In addition, as illustrated in FIG. 4, the inner circumferential surface of the upper projecting portion 315 of the rotating member 31 preferably includes a pumping groove array 64 arranged in a spiral pattern. The rotating member 31 is configured to rotate in one direction with respect to the shaft 22 and the lower annular member 23 while the spindle motor 11 is running. At this time, the pumping groove array 64 induces a dynamic pressure in a portion of the lubricating fluid 60 which is present between the outer circumferential surface of the upper annular portion 221 and the inner circumferential surface of the upper projecting portion 315. The lubricating fluid 60 in the upper seal portion 65 is thus attracted downward by this dynamic pressure to achieve a further reduction in the leakage of the lubricating fluid 60 through the upper seal portion 65.

Meanwhile, the lower liquid surface 602 of the lubricating fluid 60 is located between the outer circumferential surface of the wall portion 232 of the lower annular member 23 and an inner circumferential surface of the lower projecting portion 316 of the rotating member 31. That is, the outer circumferential surface of the wall portion 232 and the inner circumferential surface of the lower projecting portion 316 are configured to together define a lower seal portion 66 configured to hold the lower liquid surface 602 of the lubricating fluid 60. The lower seal portion 66 and the fluid dynamic bearing 6 are connected with each other. In the lower seal portion 66, the radial distance between the outer circumferential surface of the wall portion 232 and the inner circumferential surface of the lower projecting portion 316 is configured to gradually increase with decreasing height. The lower liquid surface 602 of the lubricating fluid 60 is accordingly attracted upward by surface tension to define a meniscus. A reduction in a leakage of the lubricating fluid 60 through the lower seal portion 66 is achieved by configuring the radial width of the lower seal portion 66 to gradually increase with decreasing height to cause the liquid surface 602 to define the meniscus.

In addition, the rotating member 31 includes a communicating hole 317 in addition to the central through hole 310. The communicating hole 317 is configured to pass through the connection portion 312 in the vertical direction radially outside of the central through hole 310 and radially inside of the upper projecting portion 315 and the lower projecting portion 316. That is, the communicating hole 317 is configured to join an upper opening 318 defined in the upper surface of the connection portion 312 and a lower opening 319 defined in the lower surface of the connection portion 312 to each other in the axial direction. The communicating hole 317 is also filled with the lubricating fluid 60.

The lubricating fluid 60 is thus arranged to continuously fill a space extending from the upper seal portion 65 to the lower seal portion 66 through a gap between the shaft 22 and the rotating member 31 and the communicating hole 317. Therefore, the lubricating fluid 60 includes only the two liquid surfaces, the liquid surface 601 held by the upper seal portion 65 and the liquid surface 602 held by the lower seal portion 66. This contributes to reducing evaporation of the lubricating fluid 60.

Figure 7:
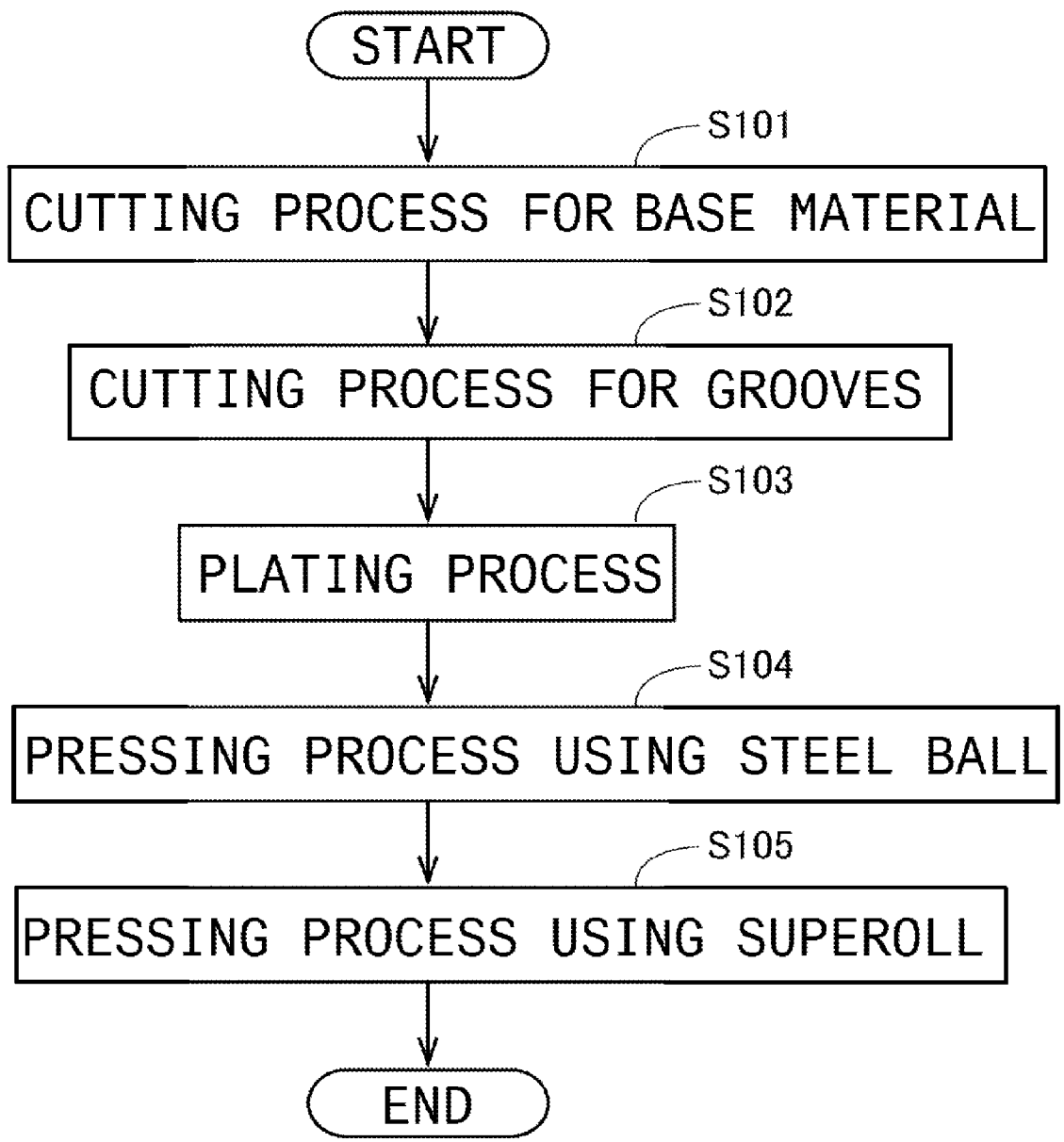
FIG. 7 is a flowchart illustrating a portion of a process of manufacturing a fluid dynamic bearing according to the first preferred embodiment of the present invention.
Figure 8:
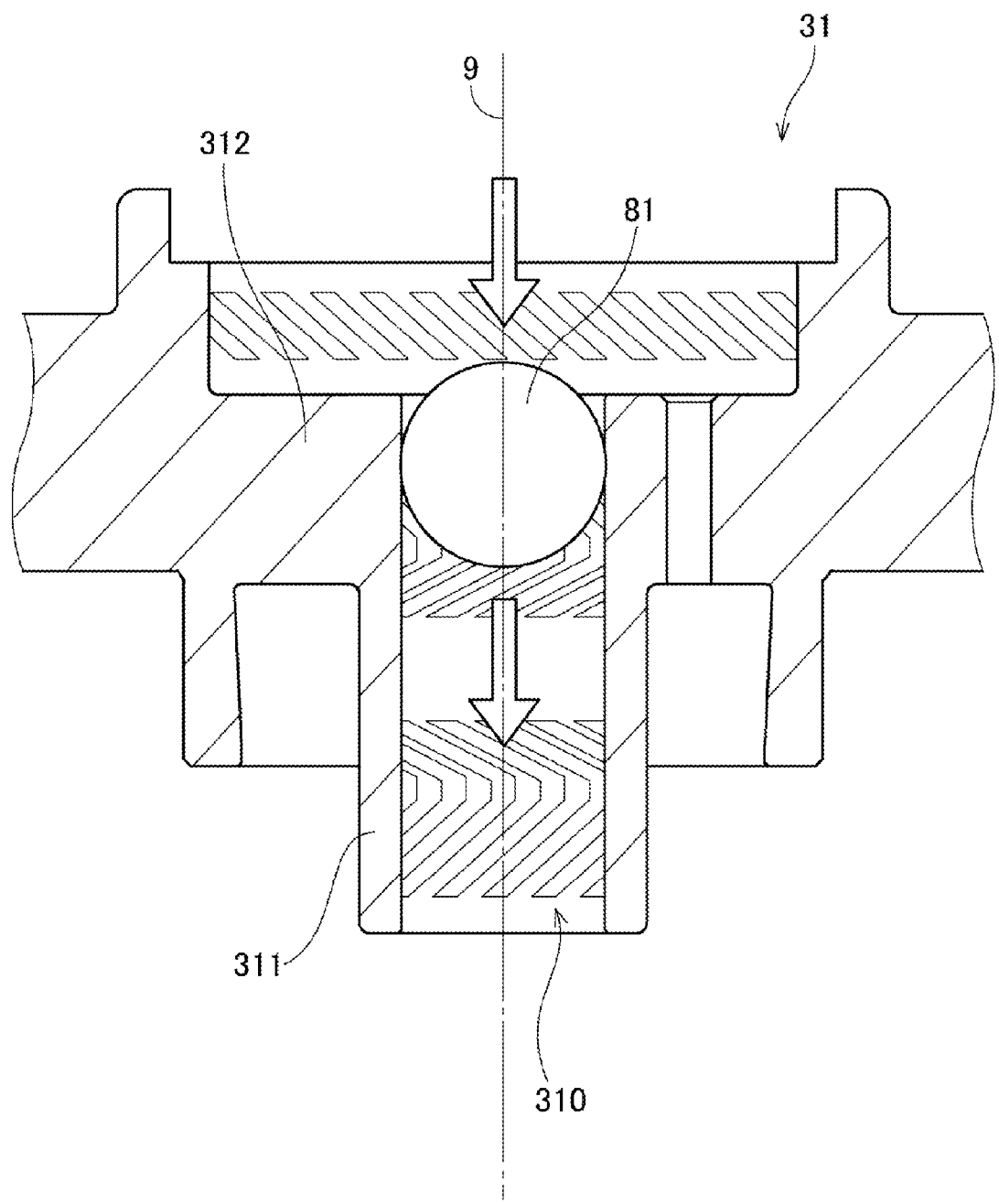
FIG. 8 is a diagram illustrating how a pressing process using a steel ball is carried out according to the first preferred embodiment of the present invention.
Figure 9:
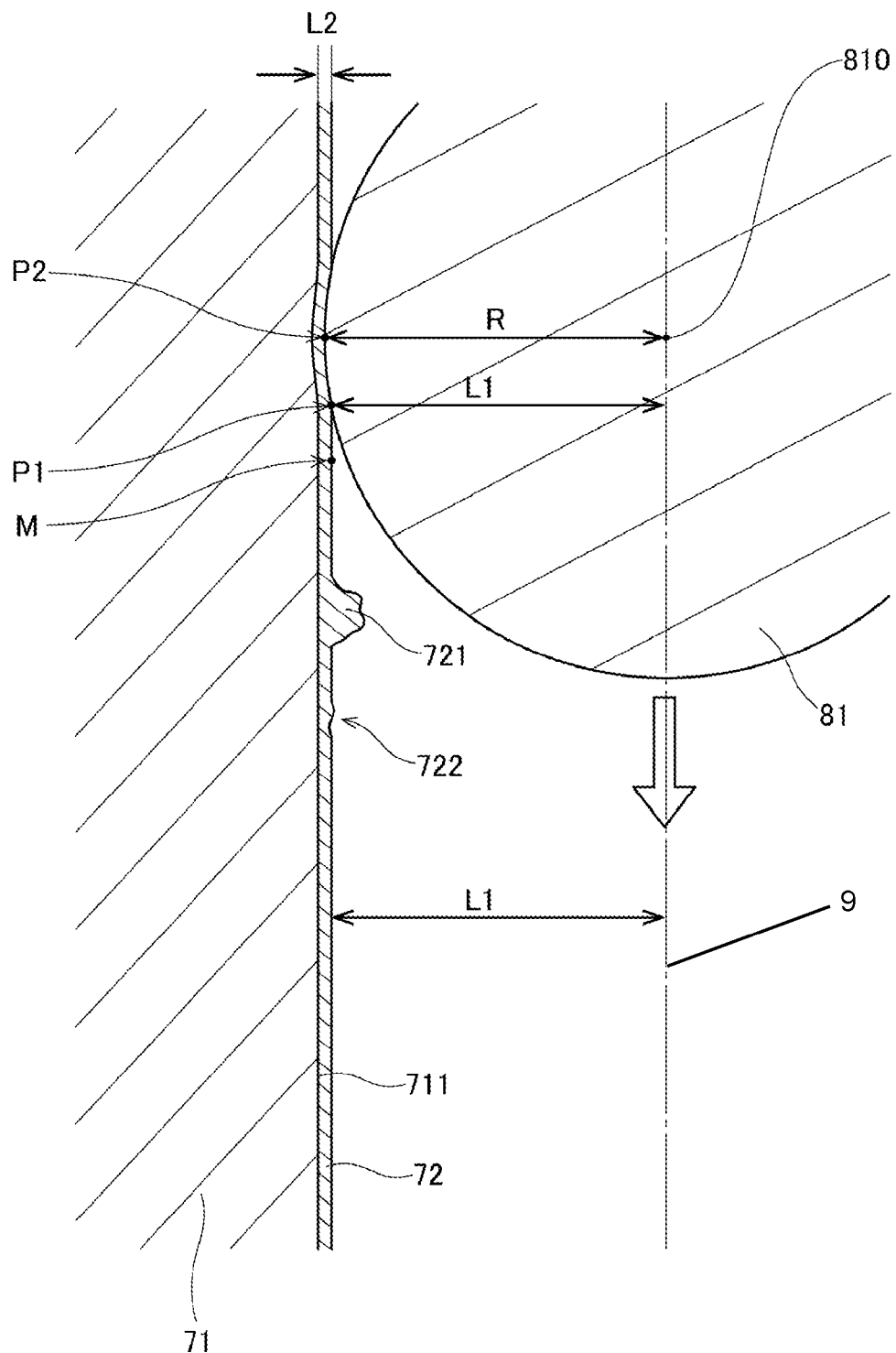
FIG. 9 is a diagram illustrating how the pressing process using the steel ball is carried out according to the first preferred embodiment of the present invention in an enlarged form.
Figure 10:
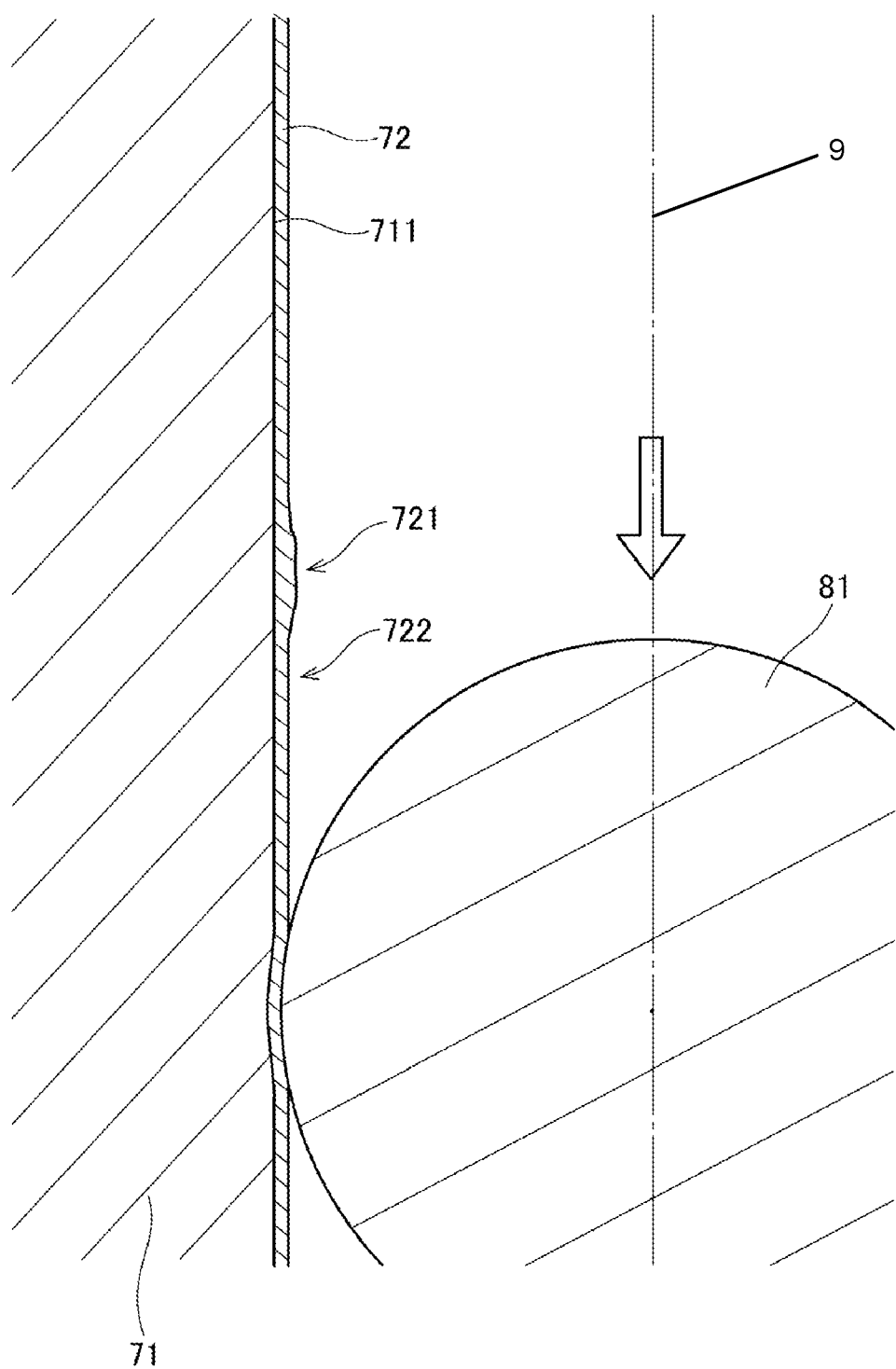
FIG. 10 is a diagram illustrating how the pressing process using the steel ball is carried out according to the first preferred embodiment of the present invention in an enlarged form.
Figure 11:
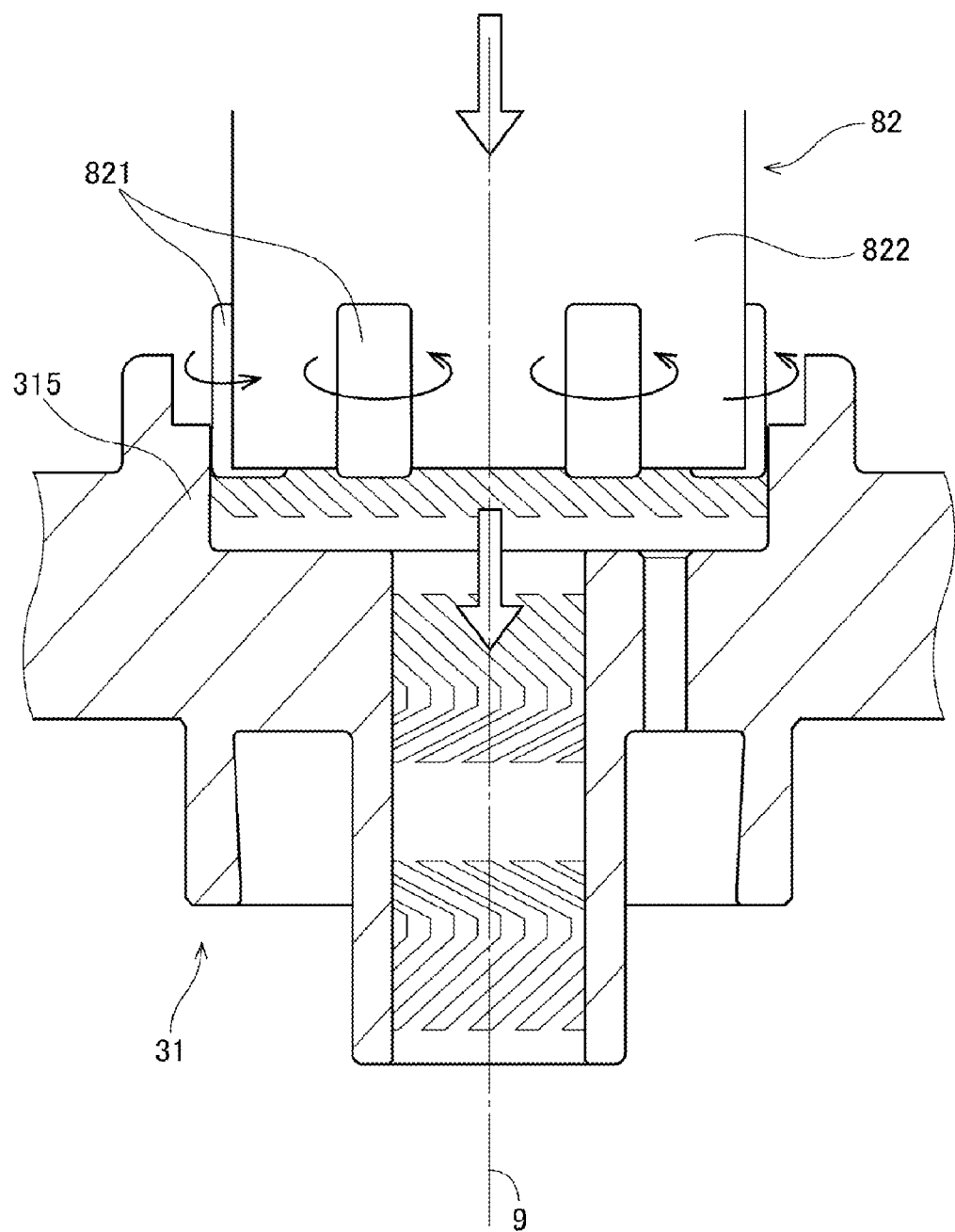
FIG. 11 is a diagram illustrating how a pressing process using a Superoll is carried out according to the first preferred embodiment of the present invention.

Next, a non-limiting example of a method of manufacturing the rotating member 31 will now be described below. As mentioned above, the rotating member 31 is the second bearing member defining a portion of the fluid dynamic bearing 6, which is the fluid bearing apparatus. FIG. 7 is a flowchart illustrating a procedure of a process of manufacturing the rotating member 31 in accordance with a preferred embodiment of the present invention. FIG. 8 is a diagram illustrating how a pressing process using a steel ball 81 is carried out. FIGS. 9 and 10 are each a diagram illustrating how the pressing process using the steel ball 81 is carried out in an enlarged form. FIG. 11 is a diagram illustrating how a pressing process using a Superoll 82 is carried out.

When the rotating member 31 is manufactured in accordance with a preferred embodiment of the present invention, first, a bar of stainless steel is subjected to a cutting process to define a base material 71 of the rotating member 31 (step S101). As a result, the shape of the rotating member 31 is formed. Hereinafter, an inner circumferential surface of a portion of the base material 71 which corresponds to the inner cylindrical portion 311 and an inner circumferential surface of a portion of the base material 71 which corresponds to the connection portion 312 will be referred to as a first base material inner circumferential surface 711 (see FIGS. 9 and 10). In addition, an inner circumferential surface of a portion of the base material which corresponds to the upper projecting portion 315 will be hereinafter referred to as a second base material inner circumferential surface (not shown). Each of the first base material inner circumferential surface 711 and the second base material inner circumferential surface is a cylindrical inner circumferential surface. At step S101, various surfaces of the base material, including the first base material inner circumferential surface 711 and the second base material inner circumferential surface, are defined by the cutting process.

Note that the base material of the rotating member 31 is made of a stainless steel containing a free-cutting element. Thus, at the time of the cutting process, chips are broken into small pieces, reducing wear of a cutting tool. The base material of the rotating member 31 is preferably made of, for example, SUS420J2, SUS430, or DHS®-1. SUS420J2 and SUS430 are standards specified by Japanese Industrial Standards (JIS).

Next, the base material is subjected to a cutting process to define a plurality of dynamic pressure grooves recessed radially outward in each of the first base material inner circumferential surface 711 and the second base material inner circumferential surface (step S102).

Next, the base material is plated with nickel (step S103). The base material is subjected to nickel strike plating, and is thereafter subjected to electroless nickel-phosphorus plating. Subjecting the base material to the nickel strike plating as described above makes it easier for an electroless nickel-phosphorus plating layer to be closely adhered to the base material. As a result, a plating layer 72 having an even or substantially even thickness is defined on a surface of the base material 71. At this time, as illustrated in FIGS. 9 and 10, the plating layer 72 is defined on both the first base material inner circumferential surface 711 and the second base material inner circumferential surface. A layer thickness of the plating layer 72 refers to the combined thickness of a nickel strike plating layer and the electroless nickel-phosphorus plating layer.

On each of the first base material inner circumferential surface 711 and the second base material inner circumferential surface, the plating layer 72 is defined in accordance with the shape of each of the dynamic pressure grooves defined at step S102. That is, portions of the surface of the base material within the dynamic pressure grooves are coated with the plating layer 72. Thus, both the radial dynamic pressure groove arrays 61 and the pumping groove array 64 are coated with the plating layer 72.

The plating layer 72 defined on the surface of the base material 71 has an even or substantially even layer thickness. However, as illustrated in FIG. 9, a nodule 721 which projects radially inward and an undulation portion 722 having an uneven layer thickness may be defined in the plating layer 72 by the plating process of step S103. Accordingly, the nodule 721 and the undulation portion 722 are smoothened in pressing processes of steps S104 and S105 to make the layer thickness of the plating layer 72 more even than before step S104. Note that either only one or both of the nodule 721 and the undulation portion 722 may be defined in the plating layer 72 according to preferred embodiments of the present invention.

At step S104, first, in order to make a portion of the plating layer 72 defined on the first base material inner circumferential surface 711 even, the steel ball 81 is caused to pass through the central through hole 310 from above downward as illustrated in FIG. 8. At this time, a surface of the steel ball 81, which is a pressing member, contacts the inner circumferential surface of the inner cylindrical portion 311 and the inner circumferential surface of the connection portion 312 to press the plating layer 72 radially outward. Accordingly, the surface of the steel ball 81 is a contact portion which contacts the plating layer 72. Thus, the layer thickness of the portion of the plating layer 72 defined on the first base material inner circumferential surface 711 is made even or substantially even.

At step S104, portions of the nodule 721 and the undulation portion 722 which have an increased layer thickness are compressed radially, and at the same time spread along a surface of the plating layer 72. As a result, the nodule 721 is deformed into a thin film extending along the surface of the plating layer 72, while a surface of a portion of the plating layer 72 which includes the undulation portion 722 is smoothened. In this process of manufacturing the rotating member 31, the surface of the plating layer 72 is smoothened without the base material 71 being plastically deformed by the pressing process. In other words, the pressing process allows the base material 71 to undergo an elastic deformation, but does not allow the base material 71 to undergo a plastic deformation.

A plastic deformation of the base material 71 would reduce dimensional accuracy of the inner circumferential surface of the inner cylindrical portion 311 and the inner circumferential surface of the connection portion 312, both of which define portions of the fluid dynamic bearing 6. However, in this process of manufacturing the rotating member 31, the surface of the plating layer 72 is smoothened without causing a plastic deformation of the base material 71. Thus, the dimensional accuracy of the surfaces which define portions of the fluid dynamic bearing 6 is improved.

The steel ball 81, which is the pressing member, has a Young's modulus greater than the Young's modulus of the base material 71. Thus, at the time of the pressing process, the amount of elastic deformation of the steel ball 81 is not greater than that of the base material 71. This makes it easier to smoothen the plating layer 72 while allowing the base material 71 to undergo an elastic deformation. Note that the Young's modulus of the pressing member may be equal to the Young's modulus of the base material 71.

Also note that only a portion of the steel ball 81 which includes the surface thereof, which is the contact portion, may be made of a material having a Young's modulus greater than that of the base material 71. For example, it may be configured such that a central portion of the steel ball 81 is made of a material having a Young's modulus smaller than that of the base material 71, and that the central portion is subjected to a surface treatment to define an outer layer portion having a Young's modulus greater than that of the base material 71. Also, it may be so arranged that the steel ball 81 is made of a material having a Young's modulus smaller than that of the base material 71, and that a thin film having a Young's modulus greater than that of the base material 71 is defined on the surface of the steel ball 81.

In FIG. 9, the radius of the steel ball 81 is a distance R. In other words, the distance from a central point 810 of the steel ball 81 to every point on the surface of the steel ball 81 is equal or substantially equal to the distance R. Here, on the assumption that L1 denotes an average distance from the central axis 9 to the surface of the portion of the plating layer 72 defined on the first base material inner circumferential surface 711, the distance R is greater than the distance L1. Accordingly, when the steel ball 81 is caused to pass through the central through hole 310, a portion of the base material 71 near the first base material inner circumferential surface 711 and the plating layer 72 are pressed radially outward to undergo a deformation.

Here, it is assumed that L2 denotes an average layer thickness of the plating layer 72. A difference between the distance R and the distance L1 is equal to the average layer thickness L2 or smaller than the average layer thickness L2. In other words, an average interference between the plating layer 72 and the steel ball 81 is equal to or smaller than the average layer thickness L2 of the plating layer 72. Accordingly, portions of the plating layer 72 which have a relatively even layer thickness, where neither the nodule 721 nor the undulation portion 722 is defined, are able to undergo an elastic deformation but are not easily plastically deformed. The above adjustment of the interference contributes to preventing the portions of the plating layer 72 which have a relatively even layer thickness and the base material 71 from undergoing a plastic deformation.

In addition, a yield stress of the base material 71 is greater than a yield stress of the plating layer 72. Accordingly, when a radially outward stress is applied from the steel ball 81, the plating layer 72 is plastically deformed before the base material 71. This contributes to more effectively preventing the base material 71 from being plastically deformed.

Referring to FIG. 9, a portion of the surface of the steel ball 81 which is located axially below the central point 810 and which is distant from the central axis 9 by the distance L1 (i.e., a first distance) will be referred to as a first contact portion P1. In addition, a portion of the surface of the steel ball 81 which is distant from the central axis 9 by the distance R (i.e., a second distance) will be referred to as a second contact portion P2. Each of the first contact portion P1 and the second contact portion P2 is an annular contact portion such that every point of the first contact portion P1 is equidistant from the central axis point of the second contact portion P2 is equidistant from the central axis 9. Note that, in FIG. 9, only one point of the first contact portion P1 and only one point of the second contact portion P2 are shown.

In FIG. 9, the steel ball 81 is in contact with the plating layer 72 over an area above a point M of the surface of the plating layer 72 at which the layer thickness of the plating layer 72 is equal to the average layer thickness L2. If the steel ball 81 moves downward from its current position, the first contact portion P1 contacts the point M first of the whole steel ball 81. As the steel ball 81 moves further downward, the radius of a portion of the steel ball 81 which is in contact with the aforementioned point gradually increases until the second contact portion P2, which is most distant from the central axis 9 of the whole steel ball 81, contacts the point M. As described above, focusing on each point of the surface of the plating layer 72, step S104 includes a first step, at which the point contacts the first contact portion P1, and a second step, at which the point contacts the second contact portion P2 after the first step.

Similarly, also in the case where the steel ball 81 contacts the nodule 721 and the undulation portion 722, as the steel ball 81 moves downward, the radius of a portion of the steel ball 81 which is in contact with each point on a surface of each of the nodule 721 and the undulation portion 722 gradually increases. This leads to a reduction in the likelihood that a stress will be at once applied to any portion of the nodule 721 or of the undulation portion 722 which has a large layer thickness to cause a portion of the base material 71 near that portion to undergo a plastic deformation.

Then, referring to FIG. 11, at step S105, in order to make a portion of the plating layer 72 defined on the second base material inner circumferential surface even, the Superoll 82 is moved in the axial direction with a plurality of rollers 821 of the Superoll 82 being in contact with the inner circumferential surface of the upper projecting portion 315. As a result, the layer thickness of the portion of the plating layer 72 defined on the second base material inner circumferential surface is made even.

The Superoll 82 is preferably a pressing member including a columnar body 822 and the plurality of rollers 821 attached thereto, with the rollers 821 being arranged at regular or substantially regular intervals in the circumferential direction. Each roller 821 is configured to rotate about a rotation axis extending in the vertical direction. Accordingly, when the Superoll 82 is located radially inside of the upper projecting portion 315, a portion of each roller 821 which is arranged farthest radially outward with respect to the body 822 defines one of a plurality of contact portions which are equidistant from the central axis 9.

As described above, in the process of manufacturing the rotating member 31 included in the bearing apparatus of the fluid dynamic bearing 6, the pressing processes are performed after the plating process, and thus, dimensional accuracy of the rotating member 31 is improved.

Because the base material 71 is defined by subjecting a bar-shaped material to the cutting process, cut marks having uneven ridges remain thereon. In the case where the cut marks are on the surface of the base material 71, even if the unevenness of the cut marks is slight, the nodule 721 and the undulation portion 722 tend to easily occur in the plating process. This makes the preferred embodiments of the present invention particularly useful.

In addition, the base material 71 is made of a metal containing the free-cutting element. This permits the free-cutting element to be exposed in a cutting surface, producing the nodule 721. Therefore, in the case where the base material 71 contains the free-cutting element, there is a great need to smoothen the surface of the plating layer 72.

Further, the dynamic pressure grooves are defined in the inner circumferential surface of the rotating member 31. When an uneven area defined by the dynamic pressure grooves is on the surface of the base material 71, the nodule 721 tends to easily occur at a boundary between a recess and a projection. This makes the preferred embodiments of the present invention particularly useful.

While preferred embodiments of the present invention have been described above, the present invention is not limited to the above-described preferred embodiments.

Note that, although the steel ball and the Superoll are preferably used as the pressing members according to the above-described preferred embodiments, other types of pressing members may alternatively be used. For example, a reamer or a metallic member in any of a variety of desirable shapes, including a columnar shape, may be alternatively used as the pressing member.

Also note that, although the base material of the bearing member is defined by the cutting process according to the above-described preferred embodiments, other methods may be used to define the base material. Even in that case, the dimensional accuracy of the bearing member is improved by smoothing the plating layer without allowing the base material to undergo a plastic deformation in the pressing process.

Also note that, although the plurality of dynamic pressure grooves are preferably defined by the cutting process according to the above-described preferred embodiments, other methods may be used to define the plurality of dynamic pressure grooves. For example, the plurality of dynamic pressure grooves may be defined by electrochemical machining or a rolling process.

Also note that spindle motors according to other preferred embodiments of the present invention may be motors configured to rotate disks other than the magnetic disks, such as optical disks.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to a method of manufacturing a fluid bearing apparatus and a spindle motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a fluid bearing apparatus including a plated bearing member, the method comprising the steps of:
    a) plating a metallic base material including a cylindrical base material inner circumferential surface to define a plating layer on the base material inner circumferential surface; and
    b) bringing a contact portion of a pressing member into contact with the plating layer after step a); wherein
    at least a portion of the pressing member including the contact portion has a Young's modulus equal to or greater than a Young's modulus of the base material;
    in step b), by bringing the pressing member into contact with the plating layer, a surface of the plating layer is smoothened without causing plastic deformation of the base material;
    every point on the surface of the plating layer is equidistant or substantially equidistant from a central axis;
    the pressing member contact portion is a single contact portion, the single contact portion being annular and every point on the contact portion being equidistant or substantially equidistant from the central axis, or the pressing member includes a plurality of contact portions, every point on each contact portion being equidistant or substantially equidistant from the central axis; and
    in step b), a difference between a distance from the central axis to the contact portion and a distance from the central axis to the surface of the plating layer is equal or substantially equal to an average layer thickness of the plating layer or smaller than the average layer thickness of the plating layer.

2. The method of manufacturing the fluid bearing apparatus according to claim 1, wherein
    the pressing member includes:
        a first contact portion which is distant from the central axis by a first distance; and
        a second contact portion which is distant from the central axis by a second distance greater than the first distance; and
    step b) includes the substeps of:
        b1) bringing the first contact portion of the pressing member into contact with the surface of the plating layer; and
        b2) bringing the second contact portion of the pressing member into contact with the surface of the plating layer after substep b1).

3. The method of manufacturing the fluid bearing apparatus according to claim 2, wherein
    the pressing member includes a steel ball; and
    in step b), the pressing member is caused to move along the central axis while contacting the surface of the plating layer.

4. The method of manufacturing the fluid bearing apparatus according to claim 3, further comprising a step of c) defining the base material inner circumferential surface in the base material by a cutting process before step a).

5. The method of manufacturing the fluid bearing apparatus according to claim 4, wherein the base material includes a metal including a free-cutting element.

6. The method of manufacturing the fluid bearing apparatus according to claim 2, further comprising a step of c) defining the base material inner circumferential surface in the base material by a cutting process before step a).

7. The method of manufacturing the fluid bearing apparatus according to claim 1, further comprising a step of c) defining the base material inner circumferential surface in the base material by a cutting process before step a).

8. The method of manufacturing the fluid bearing apparatus according to claim 1, wherein the base material inner circumferential surface includes a plurality of dynamic pressure grooves each of which is recessed radially outward.

9. The method of manufacturing the fluid bearing apparatus according to claim 1, wherein a yield stress of the base material is greater than a yield stress of the plating layer.

10. The method of manufacturing the fluid bearing apparatus according to claim 1, wherein in step b), a nodule projecting from the surface of the plating layer is deformed into a thin film extending along the surface of the plating layer.

11. The method of manufacturing the fluid bearing apparatus according to claim 1, wherein in step b), a layer thickness of the plating layer is made more even than before step b).

12. A spindle motor comprising a stationary portion and a rotating portion configured to rotate with respect to the stationary portion, wherein the rotating portion is supported through a fluid bearing apparatus manufactured by the method according to claim 1 such that the rotating portion is rotatable with respect to the stationary portion.

13. The spindle motor according to claim 12, wherein
the stationary portion includes an armature;
the rotating portion includes the bearing member and a magnet; and
the bearing member includes:
   an inner cylindrical portion including a cylindrical inner circumferential surface on which the plating layer is defined;
   an outer cylindrical portion configured to hold the magnet with a radially inner side thereof;
   a connection portion extending radially to join the inner cylindrical portion and the outer cylindrical portion to each other; and
   an annular disk mount portion on to which a disk is capable of being mounted.

* * * * *